Patented Mar. 8, 1932

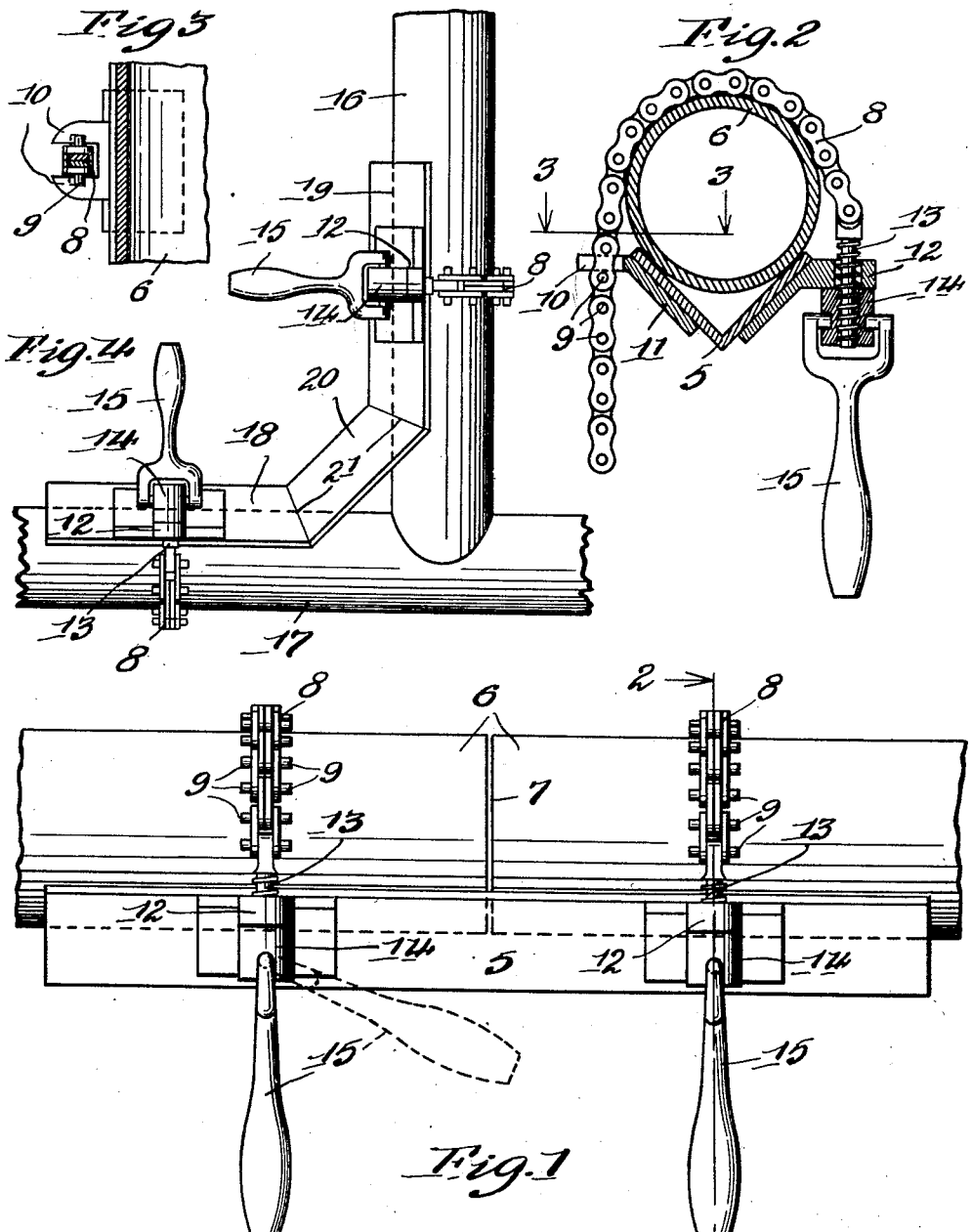

1,848,527

UNITED STATES PATENT OFFICE

DANIEL W. HICKEY, OF ST. PAUL, MINNESOTA

PIPE CLAMP

Application filed July 26, 1930. Serial No. 471,054.

This invention relates to pipe clamps for use in temporarily holding pipe sections together in situ preparatory to welding or brazing the joints. As far as I am aware, the clamps heretofore provided for pipe are unsuited for such use because of their cumbersome, relatively complicated structure and excessive weight.

It is my object to facilitate the work of welding sections of pipe together, in systems such as those employed for plumbing and heating purposes, by providing novel, compact clamps for quickly securing the sections in proper positions for welding or brazing.

The invention will be best understood by reference to the accompanying drawings in which Figure 1 is a side elevation of my device in position for securing two straight sections of pipe in end to end relation; Fig. 2 is a transverse section taken along on the line 2—2 of Fig. 1; Fig. 3 is a fragmentary section taken on the line 3—3 of Fig. 2 and Fig. 4 is a side elevation showing the device in use for securing a transverse or branch pipe to another pipe in suitable positions for welding.

As shown in Figs. 1 and 2, I provide a longitudinal member 5 consisting of a single piece of angle bar adapted to form a trough to receive adjoining ends of pipe sections 6 which are to be joined at their ends 7. The member 5 is sufficiently long to accurately direct the pipe sections. The pipe sections are adapted to be secured in the longitudinal member by chains 8 having pairs of pins 9 projecting from each link to engage claws 10 projecting from one side of the member 5. These claws 10 are rigid projections from the end of a plate 11 and, as shown in Fig. 3, are spaced apart to receive the chain 8 between them. The plate 11 is preferably welded to the member 5.

Secured to the member 5 opposite the claws 10 is a bearing 12 through which a screw 13 passes. One end of this screw is secured to an end of the chain 8 and its other end is threaded in a nut 14, engaging the bar 12 and adapted to be turned by handle 15. The handle is pivotally connected to the nut 14 to permit movement laterally from the axis of the screw 13 as indicated in dotted lines in Fig. 1.

For use in securing a laterally extending pipe section 16 to a pipe section 17, I provide, in place of the straight member 5, angle bars 18 and 19 arranged as shown in Fig. 4. The section 18 of angle bar is rigidly secured to the section 19 by an oblique member 20, these sections and member 20 being constructed from standard angle bars and preferably secured together by welding the joints 21. The chain clamps are secured to the sections 18 and 19 as shown in Figs. 1 and 2.

In assembling a plumbing or heating system a number of the pipe sections may be cut, placed near their final positions and a number of my improved clamps distributed where the joints are to be located. To secure straight pipe sections together the ends to be joined are placed in the trough formed by the longitudinal member 5 and then the chains 8 are merely thrown over the pipes and engaged with the claws 10. Finally, the handles 15 are manipulated to draw the chains 8 tightly about the pipe. The long bearing for the pipe sections insures proper retention of the straight sections in alignment. For elbow and T joints and elsewhere where a lateral pipe is to be joined, the angular arrangement of members 18 and 19 is provided and the pipe sections may be clamped thereto in manner which will now be readily understood. After a number of pipe sections have thus been assembled in situ they may be quickly welded or brazed together and then the clamps may be removed by loosening the chains and disengaging the pins 9 from the claws 10. In order to weld the portion of the joint within the trough formed by the members 5, it is necessary to remove the clamp. This can be done after the pipe is partially secured by welding.

By constructing the longitudinal member from a single bar of standard, heavy gauge metal, I so reduce the cost of the device that a large number may be economically employed in assembling a system of the class described. The angle bar affords a continuous bearing to insure proper alignment and gives strength and rigidity to the structure. The V shaped pipe engaging member is also adapted to receive pipes of widely different sizes.

Having described my invention, what I claim as new and desire to protect by Letters Patent is:

1. A clamp for securing a plurality of pipes in fixed relative positions comprising a rigid bar having longitudinally spaced sections each provided with angularly disposed contact surfaces adapted to engage a pipe at points spaced on its periphery and also spaced widely along the pipe, a single chain for each section of said bar positioned to engage the periphery of a pipe between said widely spaced contact points, means adjustably connecting an end of each of said chains to a side of said bar and means adapted to be manipulated to tighten the chains.

2. A clamp for securing a plurality of pipes in fixed relative positions comprising a rigid bar having longitudinally spaced sections, angularly disposed to each other and each provided with angularly disposed contact surfaces adapted to engage a pipe at points spaced on its periphery and also spaced widely along the pipe, a single chain for each section of said bar positioned to engage the periphery of a pipe between said widely spaced points of contact, means adjustably connecting an end of each of said chains to a side of said bar and means adapted to be manipulated to tighten the chains.

In testimony whereof, I have hereunto signed my name to this specification.

DANIEL W. HICKEY.